(12) United States Patent
Yang

(10) Patent No.: US 11,343,835 B2
(45) Date of Patent: May 24, 2022

(54) METHOD FOR TRANSMITTING DATA, TERMINAL DEVICE AND NETWORK DEVICE

(71) Applicant: GUANGDONG OPPO MOBILE TELECOMMUNICATIONS CORP., LTD., Guangdong (CN)

(72) Inventor: Ning Yang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 7 days.

(21) Appl. No.: 16/330,945

(22) PCT Filed: Nov. 4, 2016

(86) PCT No.: PCT/CN2016/104710
§ 371 (c)(1),
(2) Date: Mar. 6, 2019

(87) PCT Pub. No.: WO2018/082045
PCT Pub. Date: May 11, 2018

(65) Prior Publication Data
US 2019/0246414 A1  Aug. 8, 2019

(51) Int. Cl.
*H04W 72/12* (2009.01)
*H04L 5/00* (2006.01)
(Continued)

(52) U.S. Cl.
CPC ....... *H04W 72/1268* (2013.01); *H04L 5/0007* (2013.01); *H04L 5/0053* (2013.01);
(Continued)

(58) Field of Classification Search
CPC . H04L 27/2666; H04L 5/0007; H04L 5/0053; H04L 5/0091; H04W 72/1268;
(Continued)

(56) References Cited

U.S. PATENT DOCUMENTS

2007/0121542 A1   5/2007  Lohr
2007/0268812 A1   11/2007 Yoon
(Continued)

FOREIGN PATENT DOCUMENTS

CN    103384187 A    11/2013
CN    104780016 A     7/2015
(Continued)

OTHER PUBLICATIONS

Supplementary European Search Report in the European application No. 16920901.2, dated Aug. 9, 2019.
(Continued)

*Primary Examiner* — Omer S Mian

(57) ABSTRACT

Disclosed are a method for transmitting data, a network device and a terminal device. The method comprises: determining uplink data to be transmitted; according to a service attribute of the uplink data, obtaining a basic parameter set used for sending the uplink data; according to the basic parameter set, sending the uplink data to a network device. The method, network device and terminal device increase system transmission flexibility.

9 Claims, 11 Drawing Sheets

(51) Int. Cl.
*H04W 72/14* (2009.01)
*H04W 72/04* (2009.01)

(52) U.S. Cl.
CPC ....... *H04L 5/0091* (2013.01); *H04W 72/0486* (2013.01); *H04W 72/14* (2013.01); *H04W 72/0406* (2013.01)

(58) Field of Classification Search
CPC ............. H04W 72/0486; H04W 72/14; H04W 72/0406; H04W 72/1284; H04W 72/02; H04W 72/1278
See application file for complete search history.

(56) References Cited

U.S. PATENT DOCUMENTS

| | | | |
|---|---|---|---|
| 2015/0256308 | A1 | 9/2015 | Ma et al. |
| 2016/0191216 | A1 | 6/2016 | Ma et al. |
| 2016/0294498 | A1 | 10/2016 | Ma et al. |
| 2016/0352551 | A1* | 12/2016 | Zhang ................... H04L 5/0007 |
| 2018/0092064 | A1* | 3/2018 | Ryu ....................... H04W 48/10 |
| 2018/0234216 | A1 | 8/2018 | Ma et al. |
| 2018/0241519 | A1 | 8/2018 | Ma et al. |
| 2018/0270027 | A1 | 9/2018 | Ma et al. |
| 2019/0013904 | A1 | 1/2019 | Ma et al. |
| 2019/0081832 | A1 | 3/2019 | Marinier et al. |
| 2019/0174513 | A1* | 6/2019 | Loehr ................ H04W 72/1268 |
| 2020/0037344 | A1* | 1/2020 | Zhao ..................... H04L 5/0044 |
| 2021/0105799 | A1* | 4/2021 | Loehr ................ H04W 72/1268 |
| 2021/0314988 | A1* | 10/2021 | Ryoo ................. H04W 72/1268 |

FOREIGN PATENT DOCUMENTS

| | | |
|---|---|---|
| CN | 105682237 A | 6/2016 |
| CN | 106063353 A | 10/2016 |
| EP | 3062548 A1 | 8/2016 |
| EP | 3506698 A1 | 7/2019 |
| JP | 2019532538 A | 11/2019 |
| JP | 2019532590 A | 11/2019 |
| JP | 2019537852 A | 12/2019 |
| RU | 2407176 C2 | 12/2010 |
| RU | 2437222 C2 | 12/2011 |
| WO | 2006037492 A1 | 4/2006 |
| WO | 2016130175 A1 | 8/2016 |
| WO | 2017156224 A1 | 9/2017 |
| WO | 2018030710 A1 | 2/2018 |
| WO | 2018061438 A1 | 4/2018 |
| WO | 2018075828 A1 | 4/2018 |

OTHER PUBLICATIONS

Interdigital Communications: "UE Support for Multiple Numerologies with NR", 3GPP Draft; R2-165055, vol. RAN WG2 , No. Göteborg; Aug. 22, 2016-Aug. 26, 2016 Aug. 21, 2016 (Aug. 21, 2016), XP051126687, Retrieved from the Internet: URL:http://www.3gpp.org/ftp/Meetings_3GPP_SYNC/RAN2/Docs/ [retrieved on Aug. 21, 2016] * Sections 1-3 *.
Samsung: "Discussion on different scaling methods for NR subcarrier spacing", 3GPP Draft; R1-163999, vol. RAN WG1 , No. Nanjing, China; May 23, 2016-May 27, 2016 May 14, 2016 (May 14, 2016), XP051096630, Retrieved from the Internet: URL:http://www.3gpp.org/ftp/tsg_ran/WG1_RL1/TSGR1_85/Docs/ [retrieved on May 14, 2016] * Sections 1-4 *.
English translation of the Written Opinion of the International Search Authority in international application No. PCT/CN2016/104710, dated Jul. 20, 2017.
First Office Action of the Chilean application No. 201901175, dated Oct. 19, 2019.
First Office Action of the Russian application No. 2019117175, dated Dec. 25, 2019.
International Search Report in international application No. PCT/CN2016/104710, dated Jul. 20, 2017.
Written Opinion of the International Search Authority in international application No. PCT/CN2016/104710, dated Jul. 20, 2017.
First Office Action of the Canadian application No. 3038835, dated Apr. 20, 2020.
First Office Action of the Chinese application No. 201680090327.X, dated Apr. 21, 2020.
Second Office Action of the Chinese application No. 201680090327.X, dated Jun. 28, 2020.
Written Opinion of the Singaporean application No. 11201903449P, dated Jun. 2, 2020.
First Office Action of the Japanese application No. 2019-516663, dated Oct. 30, 2020.
First Office Action of the Brazilian application No. BR1120190082042, dated Sep. 8, 2020.
Office Action of the Indian application No. 201917013084, dated Dec. 16, 2020.
First Office Action of the Israeli application No. 265703, dated Dec. 30, 2020.
Decision of Refusal of the Japanese application No. 2019-516663, dated Feb. 16, 2021.
First Office Action of the Taiwanese application No. 106137716, dated May 26, 2021.
Office Action of the Australian application No. 2016428456, dated Aug. 9, 2021.
European Search Report in the European application No. 21178175.2, dated Aug. 19, 2021.
First Office Action of the Indonesian application No. P00201904741, dated Nov. 5, 2021.

* cited by examiner

200 — A numerology used to receive uplink data to be transmitted is determined according to whether auxiliary information of the numerology is received from a terminal device, here, the auxiliary information is information used for a network device to acquire the numerology ~ S210

The uplink data is received according to the numerology ~ S220

FIG. 3

METHOD FOR TRANSMITTING DATA, TERMINAL DEVICE AND NETWORK DEVICE

TECHNICAL FIELD

The disclosure relates to the field of communications, and more particularly, to a method for transmitting data, a terminal device and a network device.

BACKGROUND

In a 5$^{th}$-Generation (5G) communication system, for diversified service requirements, multiple numerology transmission technologies are introduced into a physical layer. Numerologies of each type may include different frame structures, Transmission Time Interval (TTI) durations, subcarrier spacings and the like. When there is data required to be transmitted in a 5G system, a method for transmitting data according to a determined numerology is needed to improve system transmission flexibility.

SUMMARY

In view of this, embodiments of the disclosure provide a method for transmitting data and device, which may improve system transmission flexibility.

In a first aspect, there is provided a method for transmitting data, which may include the following operations.

Uplink data to be transmitted is determined; a numerology used to send the uplink data is acquired according to a service attribute of the uplink data; and the uplink data is sent to a network device according to the numerology.

The numerology used to send the uplink data is acquired according to the service attribute of the uplink data, so that under the condition that multiple numerologies are configured for a terminal device, system transmission flexibility may be improved.

In a possible implementation mode, the operation that the numerology used to send the uplink data is acquired according to the service attribute of the uplink data may include that: the numerology is determined according to the service attribute and preconfigured correspondences between service attributes and numerologies.

The service attribute may include at least one of: a logical channel used to send the uplink data, a bearer used to send the uplink data, a data stream used to send the uplink data, a data volume of the uplink data, or a quality of service level of the uplink data.

The correspondences may be correspondences between logical channels and numerologies, may also be correspondences between bearers and numerologies, may also be correspondences between data streams and numerologies, may also be correspondences between data volumes and numerologies and may also be correspondences between quality of service levels and numerologies.

In a possible implementation mode, the operation that the numerology used to send the uplink data is acquired according to the service attribute of the uplink data may include that: identification information used to identify the service attribute is sent to the network device; and the numerology sent by the network device is received, here, the numerology is determined according to the identification information.

The identification information may be an identifier of the logical channel, may also be an identifier of the bearer, may also be an identifier of the data stream, may also be an identifier of the data volume and may also be an identifier of the quality of service level.

Optionally, the network device may send the correspondences to the terminal device through high-layer signaling or physical-layer signaling and the terminal device may receive the correspondences.

In a possible implementation mode, the method may further include that: auxiliary information of the numerology is sent to the network device, here, the auxiliary information of the numerology is information used for the network device to acquire the numerology.

Optionally, in a possible implementation mode, the method may further include that: responsive to it is determined that auxiliary information of the numerology is the same as auxiliary information of a stored numerology, no the auxiliary information of the numerology is sent to the network device, here, the auxiliary information of the numerology is information used for the network device to acquire the numerology.

Optionally, the auxiliary information may include at least one of: an identifier of a numerology used to send the uplink data or next uplink data to be transmitted, an identifier of a logical channel, an identifier of a bearer, an identifier of a data volume, or an identifier of a quality of service level.

Optionally, the auxiliary information of the stored numerology may include auxiliary information of a numerology for previous uplink data, auxiliary information of a preconfigured numerology or auxiliary information of a default numerology.

In a possible implementation mode, the operation that the auxiliary information of the numerology is sent to the network device may include that: the auxiliary information is sent to the network device through a Media Access Control (MAC) Protocol Data Unit (PDU) or high-layer signaling; and the method may further include that: an uplink grant used to schedule the uplink data is received from the network device.

Optionally, the terminal device may send the auxiliary information to the network device through the MAC PDU carrying the data volume.

In a possible implementation mode, the operation that the auxiliary information of the numerology is sent to the network device may include that: the auxiliary information is sent to the network device through an uplink physical channel; and the operation that the uplink data is sent to the network device according to the numerology may include that: the uplink data is sent to the network device through the uplink physical channel according to the numerology.

Optionally, the auxiliary information may be sent to the network device through a header of the uplink physical channel.

In a second aspect, there is provided a method for transmitting data, which may include the following operations.

A numerology used to receive uplink data to be transmitted is determined according to whether auxiliary information of the numerology is received from a terminal device, here, the auxiliary information is information used by a network device to acquire the numerology; and the uplink data is received according to the numerology.

A method for selecting the numerology used to receive the uplink data is proposed, so that system transmission flexibility may be improved.

In a possible implementation mode, the operation that the numerology used to receive the uplink data to be transmitted is determined according to whether the auxiliary information of the numerology is received from the terminal device may include that: when the auxiliary information sent by the terminal device is received, the numerology is determined according to the auxiliary information; or, when no the auxiliary information sent by the terminal device is received, a stored numerology is determined as the numerology.

Optionally, the stored numerology may include a numerology for previous uplink data, a preconfigured numerology or a default numerology.

In a possible implementation mode, the auxiliary information may include identification information used to identify a service attribute of the uplink data, and the operation that the numerology is determined according to the auxiliary information may include that: the numerology is determined according to the identification information and correspondences between service attributes and numerologies.

Optionally, the auxiliary information may include at least one of: an identifier of a numerology used to send the uplink data or next uplink data to be transmitted, an identifier of a logical channel, an identifier of a bearer, an identifier of a data volume, or an identifier of a quality of service level.

In a possible implementation mode, the operation that the uplink data is received according to the numerology may include that: when the auxiliary information is acquired through a MAC PDU or high-layer signaling, an uplink grant used to schedule the uplink data is determined according to the numerology; and the uplink data sent by the terminal device according to the uplink grant is received.

In a possible implementation mode, the operation that the uplink data is received according to the numerology may include that: when the auxiliary information is acquired through an uplink physical channel, the uplink data carried in the uplink physical channel is received and demodulated according to the numerology.

Optionally, the network device may also send correspondences between service attributes and numerologies to the terminal device through high-layer signaling or physical-layer signal.

In a third aspect, there is provided a terminal device, which is configured to execute the method in the first aspect or any possible implementation mode of the first aspect. Specifically, the terminal device includes units configured to execute the method in the first aspect or any possible implementation mode of the first aspect.

In a fourth aspect, there is provided a network device, which is configured to execute the method in the second aspect or any possible implementation mode of the second aspect. Specifically, the network device includes units configured to execute the method in the second aspect or any possible implementation mode of the second aspect.

In a fifth aspect, there is provided a terminal device, which includes a memory, a processor, a transceiver, a communication interface and a bus system. The memory, the processor and the transceiver are connected through the bus system. The memory is configured to store an instruction, the processor is configured to execute the instruction stored in the memory, and when the instruction is executed, the processor executes the method in the first aspect and controls the transceiver to receive inputted data and information, and output data such as an operation result.

In a sixth aspect, there is provided a network device, which includes a memory, a processor, a transceiver, a communication interface and a bus system. The memory, the processor and the transceiver are connected through the bus system. The memory is configured to store an instruction, the processor is configured to execute the instruction stored in the memory, and when the instruction is executed, the processor executes the method in the second aspect and controls the transceiver to receive inputted data and information, and output data such as an operation result.

In a seventh aspect, there is provided a computer storage medium, which is configured to store computer software instructions used for the methods, including programs designed to execute the abovementioned aspects.

In the disclosure, names of the terminal device and the network device are no intended to limit the devices and, during practical implementation, these devices may appear with other names. Each device with functions similar to those in the disclosure shall fall within the scope of the claims of the disclosure and equivalent technologies thereof.

These aspects or other aspects of the disclosure will become clearer and easier to understand through the following descriptions of the embodiments.

BRIEF DESCRIPTION OF DRAWINGS

FIG. 3 is another schematic block diagram of a method for transmitting data according to an embodiment of the disclosure.

DETAILED DESCRIPTION

Figure 1:
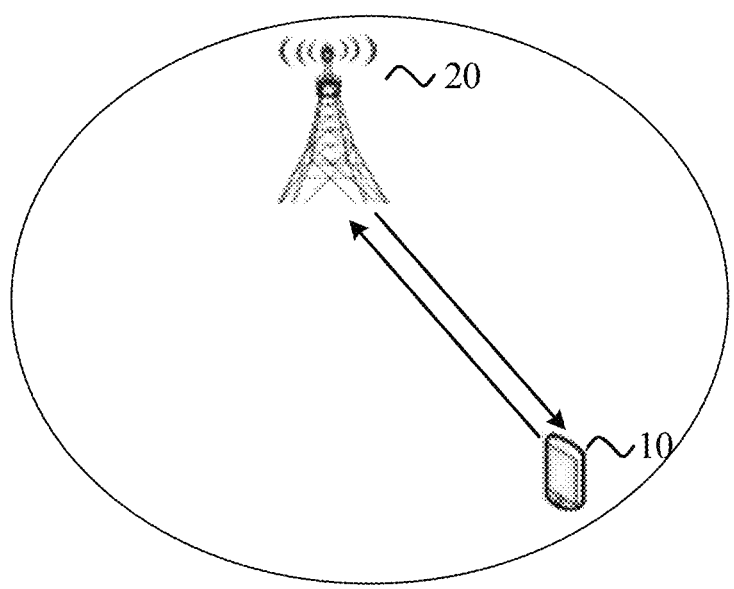
FIG. 1 is a schematic diagram of a possible application scenario according to an embodiment of the disclosure.

The technical solutions in the embodiments of the disclosure will be clearly and completely described below in combination with the drawings in the embodiments of the disclosure. It is apparent that the described embodiments are not all embodiments but part of embodiments of the disclosure. All other embodiments obtained by those of ordinary skill in the art on the basis of the embodiments in the disclosure without creative work shall fall within the scope of protection of the disclosure.

It is to be understood that the technical solutions of the embodiments of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a further 5G system.

Particularly, the technical solutions of the embodiments of the disclosure may be applied to various nonorthogonal multiple access technology-based communication systems, for example, a Sparse Code Multiple Access (SCMA) system and a Low Density Signature (LDS) system, and of course, the SCMA system and the LDS system may also have other names in the field of communications. Furthermore, the technical solutions of the embodiments of the disclosure may be applied to multicarrier transmission systems adopting nonorthogonal multiple access technologies, for example, Orthogonal Frequency Division Multiplexing (OFDM), Filter Bank Multi-Carrier (FBMC), Generalized Frequency Division Multiplexing (GFDM) and Filtered-OFDM (F-OFDM) systems adopting the nonorthogonal multiple access technologies.

In the embodiments of the disclosure, a terminal device may refer to User Equipment (UE), an access terminal, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device or another processing device connected to a wireless modem, a vehicle-mounted device, a wearable device, a terminal device in a future 5G network, a terminal device in a future evolved Public Land Mobile Network (PLMN) or the like. There are no limits made in the embodiments of the disclosure.

In the embodiments of the disclosure, a network device may be a device configured to communicate with the terminal device. The network device may be a Base Transceiver Station (BTS) in the GSM or the CDMA, may also be a NodeB (NB) in the WCDMA system, may also be an Evolutional Node B (eNB or eNodeB) in the LTE system and may further be a wireless controller in a Cloud Radio Access Network (CRAN) scenario, or the network device may be a relay station, an access point, a vehicle-mounted device, a wearable device, a network device in the future 5G network, a network device in the future evolved PLMN or the like. There are no limits made in the embodiments of the disclosure.

FIG. 1 is a schematic diagram of an application scenario according to the disclosure. A communication system in FIG. 1 may include a terminal device 10 and a network device 20. The network device 20 is configured to provide communication service for the terminal device 10 and access to a core network. The terminal device 10 searches a synchronization signal, broadcast signal and the like sent by the network device 20 to access the network, thereby communicating with the network. Arrows illustrated in FIG. 1 may represent uplink/downlink transmission implemented through a cellular link between the terminal device 10 and the network device 20.

Figure 2:
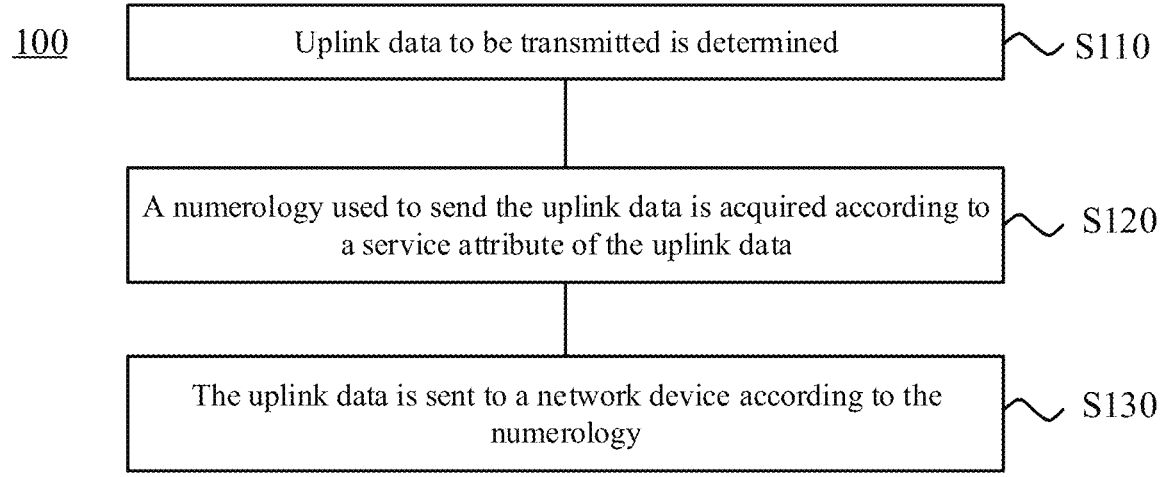
FIG. 2 is a schematic block diagram of a method for transmitting data according to an embodiment of the disclosure.

FIG. 2 is a schematic block diagram of a method 100 for transmitting data according to an embodiment of the disclosure. As illustrated in FIG. 2, the method may be executed by a terminal device, for example, UE. The method 100 includes the following operations.

In S110, uplink data to be transmitted is determined.

In S120, a numerology used to send the uplink data is acquired according to a service attribute of the uplink data.

In S130, the uplink data is sent to a network device according to the numerology.

At first, it is to be noted as follows.

First, the method of the embodiment of the disclosure may be applied to a communication system capable of determining a numerology according to a service attribute of uplink data. For convenient description, descriptions will be made only with a 5G system as an example in the embodiment of the disclosure. In addition, terms "system" and "network" in the disclosure may usually be exchanged in the disclosure. In the disclosure, term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

Second, the service attribute of the uplink data in the embodiment of the disclosure may be a logical channel used to send the uplink data, may be a bearer used to send the uplink data, may also be a data stream used to send the uplink data, may also be a data volume of the uplink data and may also be a quality of service level of the uplink data and the like. These examples are only adopted for descriptions and not intended to form any limit to the embodiment of the disclosure.

Third, the numerology of the embodiment of the disclosure may include at least one of the following parameters: a subcarrier spacing, the number of subcarriers corresponding to a system bandwidth, the number of subcarriers corresponding to a Physical Resource Block (PRB), the length of a OFDM symbol, the number of Fast Fourier Transformation (FFT) or Inverse Fast Fourier Transform (IFFT) points for generation of an OFDM signal, the number of OFDM symbols in a TTI, the number of TTIs in a first duration, or the length of a signal prefix. The subcarrier spacing refers to a frequency interval of adjacent subcarriers, for example, 15 kHz and 60 khz. The number of subcarriers under a specific bandwidth is, for example, the number of subcarriers corresponding to each possible system bandwidth. The number of subcarriers in the PRB may typically be, for example, an integral multiple of 12. The number of the OFDM symbols in the TTI may typically be, for example, an integral multiple of 14. The number of the TTIs in a certain time unit may refer to the number of TTIs in 1 ms or 10 ms. The length of the signal prefix length is, for example, a duration of a Cyclic Prefix (CP) of a signal, or a normal CP or an extended CP.

Specifically, in a future communication system such as 5G, for diversified service requirements, multiple numerology transmission technologies are introduced into a physical layer. When there is uplink data required to be transmitted in the system, different numerologies are required to be selected for data transmission according to different application-layer services, so as to improve system transmission flexibility. In other words, the numerology used to send the uplink data may be determined according to a service attribute of the uplink data, for example, the logical channel adopted for transmission of the uplink data.

Optionally, in the embodiment of the disclosure, the service attribute may be determined according to a logical channel priority. The service attribute includes a logical channel used to send the uplink data, a bearer used to send the uplink data, a data stream used to send the uplink data and a data volume of the uplink data, and may even be a quality of service level of the uplink data and the like.

It is understood by those skilled in the art that a logical channel defines a transmitted content and a MAC layer communicates with a higher layer by use of a logical channel. In the same terminal device, different logical channels have different priorities. After the terminal determines the uplink data to be transmitted, the logical channel used to send the uplink data, the bearer used to send the uplink data, the data stream used to send the uplink data, the data volume of the uplink data and the quality of service level of the uplink data may be determined according to the logical channel priority. Herein, there may exist a certain mapping relationship among the bearer, the data stream, the data volume, the quality of service level and the logical channel and there are no limits made thereto in the disclosure.

Optionally, in the embodiment of the disclosure, the network device may also preconfigure mapping relationships between numerologies and service attributes (such as the logical channel, the bearer, the data stream, the data volume or the quality of service level) and notify configuration information to the terminal device through Radio Resource Control (RRC) signaling or MAC signaling, and then the terminal device may determine, according to the configuration information notified by the network device and the determined service attribute corresponding to the uplink data, the numerology used to send the uplink data. It is to be understood that the configuration information may be mapping relationships between logical channels and numerologies, may be mapping relationships between bearers and numerologies, may also be mapping relationships between data streams and numerologies, may also be mapping relationships between data volumes and numerologies, may also be mapping relationships between quality of service levels and numerologies and may also be mapping relationships between Hybrid Automatic Repeat Request (HARQ) configurations and numerologies and the like. In addition, the mapping relationships between the service attributes and the numerologies may also indirectly be represented by mapping relationships between identifiers of various service attributes and numerologies.

Optionally, in the embodiment of the disclosure, the operation that the numerology used to send the uplink data is acquired according to the service attribute of the uplink data includes that: identification information used to identify the service attribute is sent to the network device; and the numerology sent by the network device is received, here, the numerology is determined according to the identification information.

Specifically, the network device does not send the configured mapping relationships to the terminal device and thus the terminal device may not determine the numerology according to the service attribute. The terminal device may send an identifier of the service attribute to the network device and the network device may determine the numerology adopted for transmission of the uplink data according to the identifier of the service attribute and the preconfigured mapping relationships. A manner in which the network device determines the numerology may be similar to that adopted by the terminal device and, for simplicity, will not be elaborated herein.

Under the condition that the terminal device determines the numerology, if the terminal device is further required to apply to the network device for an uplink grant used to schedule the uplink data, the terminal device is required to send auxiliary information of the numerology to the network device, here, the auxiliary information is information used by the network device to acquire the numerology. Specifically, the auxiliary information may directly be an identifier of a numerology used to send the uplink data or next uplink data to be transmitted, and may also indirectly be an identifier of a logical channel, an identifier of a bearer, an identifier of a data volume and an identifier of a quality of service level.

Optionally, in the embodiment of the disclosure, the terminal device may also judge whether the auxiliary information of the determined numerology is the same as auxiliary information of a stored numerology at first. If YES, the terminal device is not required to send the auxiliary information to the network device and the network device may further adopt the stored numerology to receive the uplink data. If NO, the terminal device may send the auxiliary information to the network device and the network device may further determine, according to the auxiliary information, the numerology for receiving the uplink data. In general, the auxiliary information of the stored numerology may be auxiliary information of a numerology for previous uplink data, and may be auxiliary information of a preconfigured numerology or auxiliary information of a default numerology, here, the default numerology is a numerology configured as a factory setting. For example, if the terminal device determines that the logical channel for the present data is the same as a logical channel for the previous data, the terminal device may determine that the numerology for the present data is the same as the numerology for the previous data.

As an embodiment, the operation that the auxiliary information of the numerology is sent to the network device includes that: the auxiliary information is sent to the network device through a MAC PDU or high-layer signaling; and the method further includes that: an uplink grant used to schedule the uplink data is received from the network device.

Specifically, the terminal device may send the auxiliary information to the network device through the MAC PDU carrying the data volume, and the terminal device may also carry the auxiliary information in RRC signaling.

As another embodiment, the operation that the auxiliary information of the numerology is sent to the network device includes that: the auxiliary information is sent to the network device through an uplink physical channel; and the operation that the uplink data is sent to the network device according to the numerology includes that: the uplink data is sent to the network device through the uplink physical channel according to the numerology.

Specifically, the terminal device may also carry the numerology for the present data in a header of the uplink physical channel. If a numerology used to transmit the next data is carried, the numerology may be transmitted through the other part of the uplink physical channel. The example is only adopted for descriptions and not intended to form limits to the embodiment of the disclosure.

It is to be understood that the terminal device may also send the auxiliary information to the network device through another MAC PDU and the terminal device may also send the auxiliary information to the network device through high-layer signaling, for example, an RRC message. A specific manner for sending the auxiliary information to the network device will not be limited in the embodiment of the disclosure.

FIG. 3 is a schematic block diagram of a method 200 for transmitting data according to an embodiment of the disclosure. As illustrated in FIG. 3, the method 200 may be executed by a network device and, for example, is executed by a base station. The method 200 includes the following operations.

In S210, a numerology used to receive uplink data to be transmitted is determined according to whether auxiliary information of the numerology is received from a terminal device, here, the auxiliary information is information used for the network device to acquire the numerology.

In S220, the uplink data is received according to the numerology.

Specifically, the network device may determine the numerology used to receive the uplink data to be transmitted, according to the auxiliary information sent by the terminal device. For example, the auxiliary information may be an identifier of a logical channel used to send the uplink data and the network device may determine the numerology used to send the uplink data, according to the identifier of the logical channel. The auxiliary information may also be an identifier of a bearer used to send the uplink data and the network device may determine the numerology used to send the uplink data, according to the identifier of the bearer. The auxiliary information may also be an identifier of a data stream used to send the uplink data and the network device may determine the numerology used to send the uplink data, according to the identifier of the data stream. The auxiliary information may also be an identifier of a data volume of the uplink data and the network device may determine the numerology according to the data volume. The auxiliary information may also be an identifier of the numerology, which has been determined by the terminal device, for sending the uplink data and the network device may determine the numerology according to the identifier of the numerology. It is to be understood that the network device may also determine the numerology according to any combination of the identifiers. There are no limits made in the embodiment of the disclosure and any information capable of determining the numerology may be adopted.

Optionally, in the embodiment of the disclosure, the network device may also preconfigure mapping relationships between numerologies and service attributes (such as the logical channel, the bearer, the data stream, the data volume or a quality of service level). The network device, after receiving the auxiliary information, may determine the numerology used to send the uplink data, according to the mapping relationships and the determined service attribute corresponding to the uplink data or identification information used to identify the service attribute. It is to be understood that the configuration information may be mapping relationships between logical channels and numerologies, may be mapping relationships between bearers and numerologies, may also be mapping relationships between data streams and numerologies, may also be mapping relationships between data volumes and numerologies, may also be mapping relationships between quality of service levels and numerologies and may also be mapping relationships between HARQ configurations and numerologies and the like. In addition, the mapping relationships between the service attributes and the numerologies may also indirectly be represented by mapping relationships between identifiers of various service attributes and numerologies. The network device may also directly determine the numerology according to the received identifier of the numerology.

If the network device does not receive the auxiliary information in a certain period of time, the network device may determine that the numerology used to transmit the present uplink data is kept unchanged and the network device may adopt a stored numerology to transmit the present uplink data.

The stored numerology may refer to a numerology for previous data, may also refer to a preconfigured numerology and may also refer to a default numerology, and the default numerology may be a numerology configured as a factory setting of the device.

In addition, the auxiliary information sent by the terminal device may also be a numerology used to transmit next data. How to acquire the numerology used to transmit the next data will not be limited in the embodiment of the disclosure. After the data arrives, the uplink data may be transmitted at two times, and when the network device is notified to determine a numerology used for first data transmission, a numerology for the next data, for example, the identifier of the numerology used for next data transmission, may also be carried.

As an embodiment of the disclosure, the method further includes that: the operation that the uplink data is received according to the numerology includes that: when the auxiliary information is acquired through a MAC PDU or high-layer signaling, an uplink grant used to schedule the uplink data is determined according to the numerology; and the uplink data sent by the terminal device according to the uplink grant is received.

As another embodiment of the disclosure, the method further includes that: the operation that the uplink data is received according to the numerology may include that: when the auxiliary information is acquired through an uplink physical channel, the uplink data carried in the uplink physical channel is received and demodulated according to the numerology.

Specifically, the terminal device may carries the auxiliary information in the MAC PDU carrying the data volume, the network device may further acquire the auxiliary information and the data volume. Moreover, the network device may also determine the uplink grant used to schedule the uplink data, according to the data volume and the determined numerology and send the uplink grant to the terminal device, so that the terminal device sends the uplink data to the network device according to the uplink grant. The terminal device may also carry the auxiliary information in a header of the uplink physical channel and carry the uplink data in the other part of the uplink physical channel, and the network device may acquire the auxiliary information from the header of the uplink physical channel and, after determining, according to the auxiliary information, the numerology used to send the uplink data, the network device may receive and demodulate the other part of the uplink physical channel according to the numerology.

Furthermore, in the embodiment of the disclosure, if the terminal device does not determine the numerology, the network device, after determining the numerology, may send to the terminal device an identifier for identifying the determined numerology. If there exist multiple numerologies for the terminal device, the terminal device may determine the numerology used to send the uplink data, according to the identifier. If there exists only one numerology for the terminal device, the identifier may also directly be information of the numerology used to send the uplink data, for example, a parameter in the numerology.

The method for transmitting data in the embodiments of the disclosure will be described below in combination with FIG. 4 to FIG. 7 from the angle of the terminal device and the network device in detail.

Figure 4:
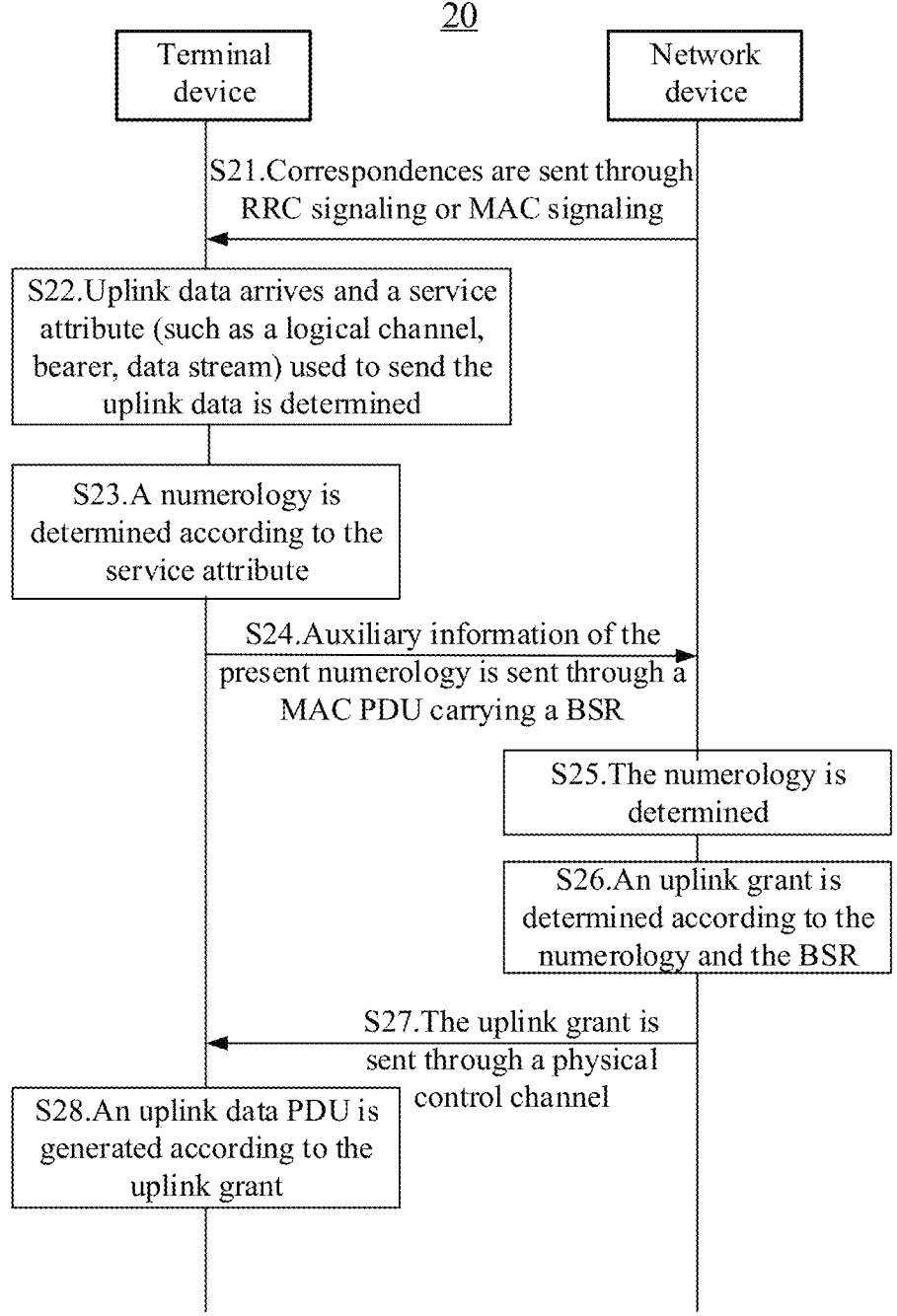
FIG. 4 is a flowchart of a method for transmitting data according to an embodiment of the disclosure.

First embodiment: as illustrated in FIG. 4, the method 20 mainly includes the following operations.

In S21, a network device sends a correspondence between each bearer and each numerology, a correspondence between each logical channel and each numerology, a correspondence between each data stream and each numerology or the like to a terminal device through RRC signaling or MAC signaling.

In S22, when the terminal device has uplink data to be sent, a service attribute (such as a logical channel used to send the uplink data, a bearer used to send the uplink data, a data stream used to send the uplink data, a data volume of the uplink data, or a quality of service level of the uplink data) is determined according to a logical channel priority at first.

In S23, the terminal device determines a numerology used to send the uplink data, according to the determined service attribute (such as the logical channel, the bearer or the data stream) and the correspondence received in S21.

In S24, if the terminal device is also required to apply for an uplink grant, auxiliary information of the numerology, which may directly be an identifier of the numerology and may also indirectly be a corresponding identifier of the logical channel, an identifier of the bearer, an identifier of the data stream, an identifier of a data volume of the uplink data, an identifier of a quality of service level of the uplink data or the like, may be sent through a MAC PDU carrying a Buffer Status Report (BSR).

In S25, if the terminal device sends the identifier of the numerology, the network device may directly determine the numerology. If the terminal device sends the identifier of the logical channel, the network device may determine the numerology used to send the uplink data, according to correspondences, which are configured for the terminal, between logical channels and numerologies. If the terminal device sends the identifier of the bearer, the network device may determine the numerology used to send the uplink data, according to correspondences, which are configured for the terminal, between bearers and numerologies. If the terminal device sends the identifier of the data stream, the network device may determine the numerology used to send the uplink data, according to correspondences, which are configured for the terminal, between data streams and the numerologies. If the terminal device sends the identifier of the data volume, the network device may determine the numerology used to send the uplink data, according to correspondences, which are configured for the terminal, between data volumes and the numerologies. If the terminal device sends the identifier of the quality of service level, the network device may determine the numerology used to send the uplink data, according to correspondences, which are configured for the terminal, between quality of service levels and numerologies.

In S26, the network device determines the uplink grant used to send the uplink data, according to the BSR reported by the terminal device and the determined numerology.

In S27, the network device sends the uplink grant through a physical control channel.

In S28, the terminal device organizes the uplink data according to the uplink grant sent by the network device.

Figure 5:
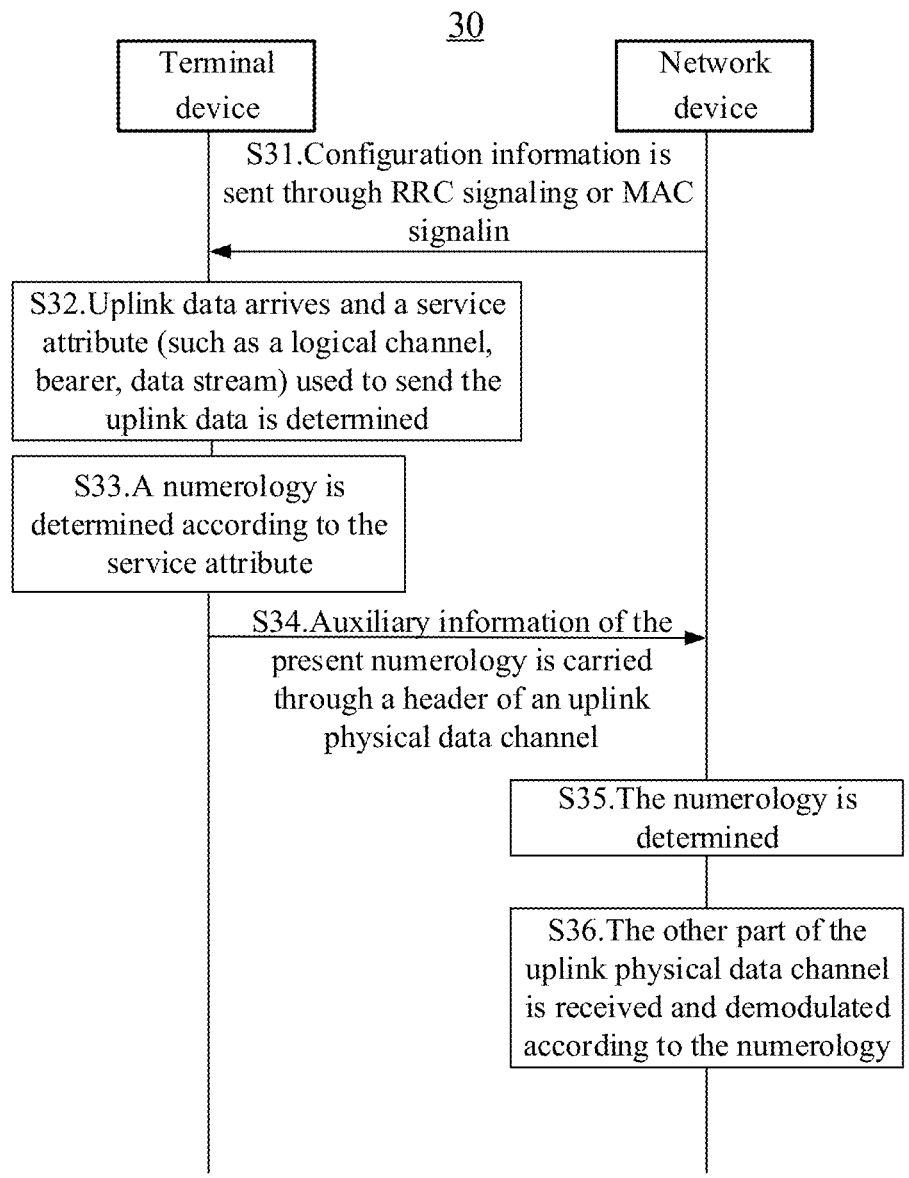
FIG. 5 is another flowchart of a method for transmitting data according to an embodiment of the disclosure.

Second embodiment: as illustrated in FIG. 5, the method 30 mainly includes the following operations.

In S31, a network device sends a correspondence between each bearer and each numerology, a correspondence between each logical channel and each numerology, a correspondence between each data stream and each numerology or the like to a terminal device through RRC signaling or MAC signaling.

In S32, when the terminal device has uplink data to be sent, a service attribute (such as a logical channel used to send the uplink data, a bearer used to send the uplink data or a data stream used to send the uplink data, a data volume of the uplink data or a quality of service level of the uplink data) is determined according to a logical channel priority at first.

In S33, the terminal device determines a numerology used to send the uplink data, according to the determined service attribute (such as the logical channel, the bearer or the data stream) and the correspondence received in S31.

In S34, the terminal device may send auxiliary information of the numerology, which may directly be an identifier of the numerology and may also indirectly be a corresponding identifier of the logical channel, an identifier of the bearer, an identifier of the data stream, an identifier of a data volume of the uplink data, an identifier of a quality of service level of the uplink data or the like, through an uplink physical data channel.

In S35, the network device may acquire the auxiliary information from a header of the uplink physical data channel and may determine the numerology used to send the uplink data, according to the auxiliary information. Specifically, if the terminal device sends the identifier of the numerology, the network device may directly determine the numerology. If the terminal device sends the identifier of the logical channel, the network device may determine the numerology used to send the uplink data, according to correspondences, which are configured for the terminal, between logical channels and numerologies. If the terminal device sends the identifier of the bearer, the network device may determine the numerology used to send the uplink data, according to correspondences, which are configured for the terminal, between bearers and the numerologies. If the terminal device sends the identifier of the data stream, the network device may determine the numerology used to send the uplink data, according to correspondences, which are configured for the terminal, between data streams and numerologies. If the terminal device sends the identifier of the data volume, the network device may determine the numerology used to send the uplink data, according to correspondences, which are configured for the terminal, between data volumes and numerologies. If the terminal device sends the identifier of the quality of service level, the network device may determine the numerology used to send the uplink data, according to correspondences, which are configured for the terminal, between quality of service levels and numerologies.

In S36, the network device may further receive and demodulate the uplink data carried in the uplink physical data channel, according to the determined numerology.

Figure 6:
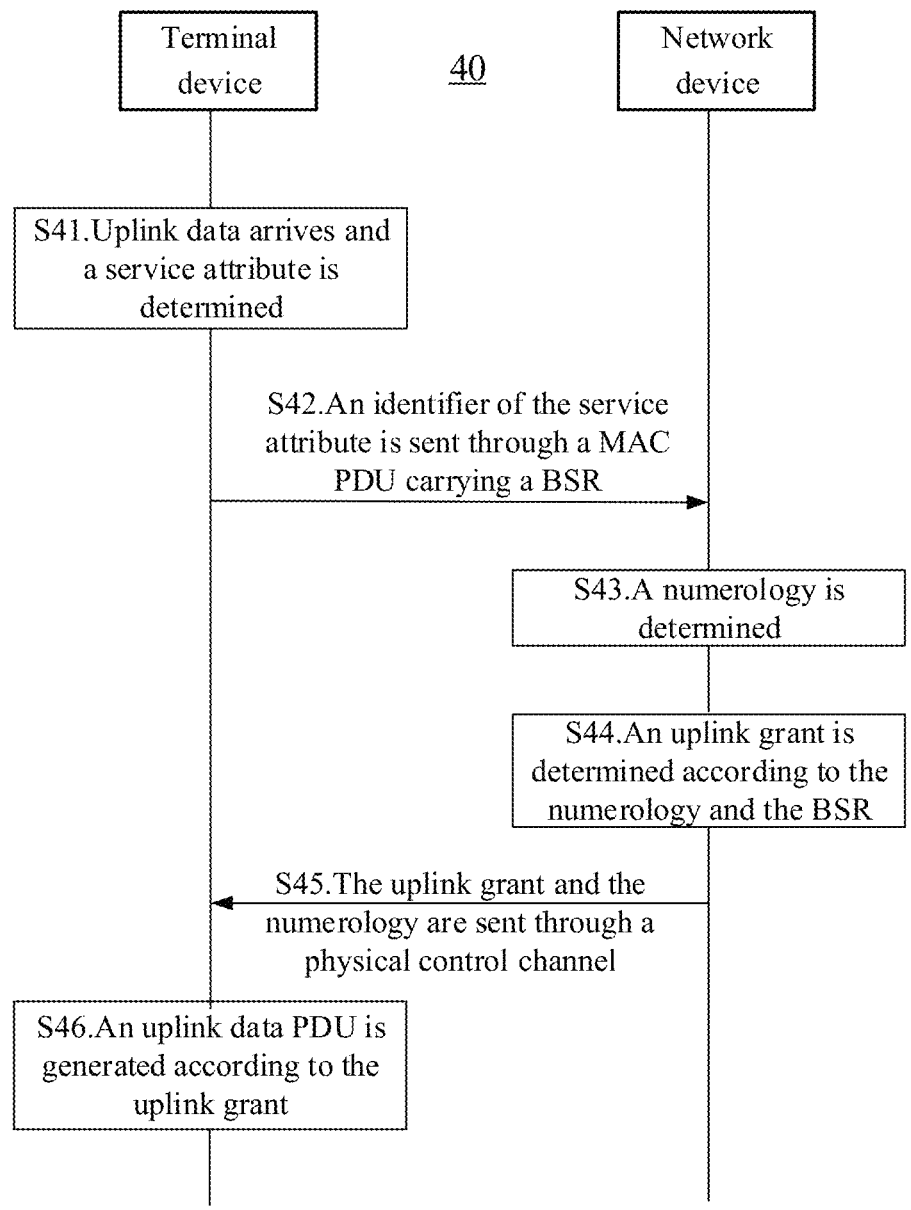
FIG. 6 is yet another flowchart of a method for transmitting data according to an embodiment of the disclosure.

Third embodiment: as illustrated in FIG. 6, the method 40 mainly includes the following operations.

In S41, when a terminal device has uplink data to be sent, a service attribute (such as a logical channel used to send the uplink data, a bearer used to send the uplink data or a data stream used to send the uplink data, a data volume of the uplink data or a quality of service level of the uplink data) is determined according to a logical channel priority at first.

In S42, if the terminal device is also required to apply for an uplink grant, a corresponding identifier of the logical channel, an identifier of the bearer, an identifier of the data stream, an identifier of a data volume of the uplink data, an identifier of a quality of service level of the uplink data or the like may be sent through a MAC PDU carrying a BSR.

In S43, if the terminal device sends the identifier of the logical channel, a network device may determine the numerology used to send the uplink data, according to logical channels configured for the terminal. If the terminal device sends the identifier of the bearer, the network device may determine the numerology used to send the uplink data, according to bearers configured for the terminal. If the terminal device sends the identifier of the data stream, the network device may determine the numerology used to send the uplink data, according to data streams configured for the terminal. If the terminal device sends the identifier of the data volume, the network device may also determine the numerology used to send the uplink data, according to data volumes. If the terminal device sends the identifier of the quality of service level, the network device may also determine the numerology used to send the uplink data, according to quality of service levels.

In S44, the network device determines the uplink grant used to send the uplink data, according to the BSR reported by the terminal device and the determined numerology.

In S45, the network device sends the uplink grant and information related to the determined numerology, for example, an identifier of the numerology, through a physical control channel.

In S46, the terminal device organizes the uplink data according to the uplink grant sent by the network device.

Figure 7:
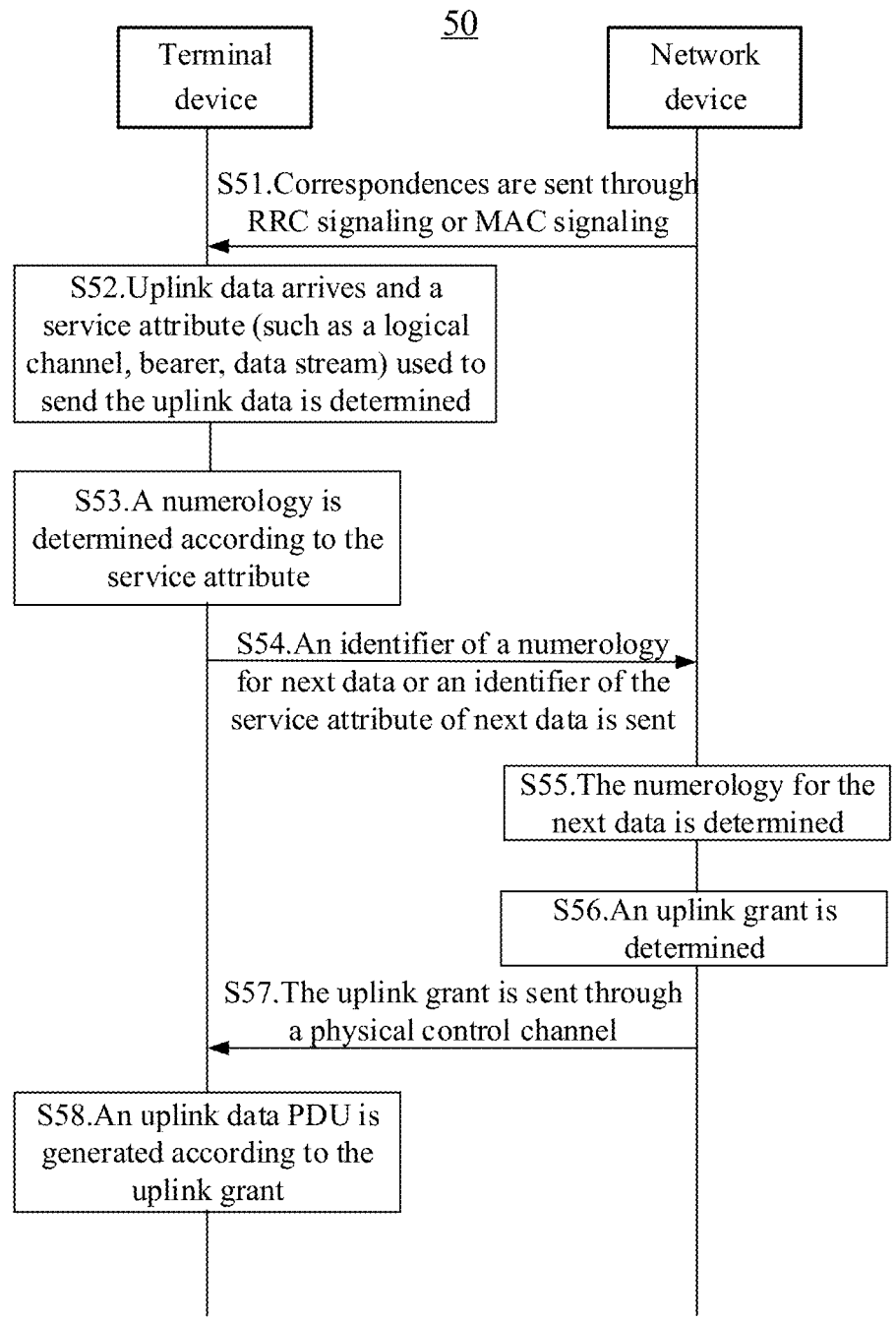
FIG. 7 is still yet another flowchart of a method for transmitting data according to an embodiment of the disclosure.

Fourth embodiment: as illustrated in FIG. 7, the method 50 mainly includes the following operations.

In S51, a network device sends a correspondence between each bearer and each numerology, a correspondence between each logical channel and each numerology, a correspondence between each data stream and each numerology or the like to a terminal device through RRC signaling or MAC signaling.

In S52, when the terminal device has uplink data to be sent, a service attribute (such as a logical channel used to send the uplink data, a bearer used to send the uplink data or a data stream used to send the uplink data, a data volume of the uplink data or a quality of service level of the uplink data) is determined according to a logical channel priority at first.

In S53, the terminal device determines a numerology used to send the uplink data, according to the determined service attribute (such as the logical channel, the bearer or the data stream) and the correspondence received in S51.

In S54, the terminal device may send to the network device auxiliary information of a numerology used to transmit next data, which may directly be an identifier of the numerology used to transmit the next downlink data and may also indirectly be a corresponding identifier of the logical channel, an identifier of the bearer, an identifier of the data stream, an identifier of a data volume of the uplink data, an identifier of a quality of service level of the uplink data or the like.

In S55, if the terminal device sends the identifier of the numerology used to transmit the next data, the network device may directly determine the numerology used to transmit the next data. If the terminal device sends the identifier of the logical channel, the network device may determine the numerology used to transmit the next data, according to correspondences, which are configured for the terminal, between logical channels and numerologies. If the terminal device sends the identifier of the bearer, the network device may determine the numerology used to transmit the next data, according to correspondences, which are configured for the terminal, between bearers and numerologies. If the terminal device sends the identifier of the data stream, the network device may determine the numerology used to transmit the next data, according to correspondences, which are configured for the terminal, between data streams and numerologies. If the terminal device sends the identifier of the data volume, the network device may determine the numerology used to transmit the next data, according to correspondences, which are configured for the terminal, between data volumes and numerologies. If the terminal device sends the identifier of the quality of service level, the network device may determine the numerology used to transmit the next data according to correspondences, which are configured for the terminal, between quality of service levels and numerologies.

In S56, the network device determines the uplink grant used to send the uplink data.

In S57, the network device sends the uplink grant through a physical control channel.

In S58, the terminal device organizes the uplink data according to the uplink grant sent by the network device.

In such a manner, according to the method for transmitting data in the embodiments of the disclosure, in a scenario that multiple numerologies are configured for the terminal, the numerology used to transmit the uplink data may be flexibly selected, thereby improving system transmission flexibility.

It is to be understood that FIG. 4 to FIG. 7 illustrate detailed operations of the method for transmitting data. However, these operations are only examples. Other operations or transformations of each operation in FIG. 4 to FIG. 7 may also be executed in the embodiments of the disclosure. In addition, each operation in FIG. 4 to FIG. 7 may be executed in sequences different from those presented in FIG. 4 to FIG. 7 and not all the operations in FIG. 4 to FIG. 7 may be executed.

Moreover, in each method embodiment, the operations on a terminal device side may be independently implemented into a method for transmitting data for the terminal device side and the operations on a network device side may be independently implemented into a method for transmitting data for the network device side. In each method embodiment, the network device is usually a base station and the terminal device is usually UE.

It is to be understood that interactions between the network device and the terminal device and related properties, functions and the like described from the network device side correspond to related properties and functions of the terminal device side and will not be elaborated herein for simplicity.

It is also to be understood that in various embodiments of the disclosure, a magnitude of a sequence number of each process does not mean an execution sequence and the execution sequence of each process should be determined by its function and an internal logic and should not form any limit to an implementation process of the embodiments of the disclosure.

The method for transmitting data according to the embodiments of the disclosure is described above in combination with FIG. 2 to FIG. 7 in detail and a device for transmitting data according to the embodiments of the disclosure will be described below in combination with FIG. 8 to FIG. 11. The technical characteristics described in the method embodiments may be applied to the following device embodiments.

Figure 8:
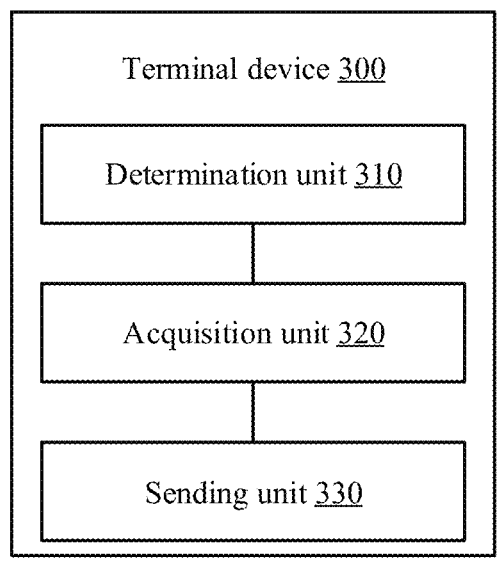
FIG. 8 is a schematic block diagram of a terminal device for transmitting data according to an embodiment of the disclosure.

FIG. 8 illustrates a terminal device 300 for transmitting data transmission according to an embodiment of the disclosure. As illustrated in FIG. 8, the terminal device 300 includes a determination unit 310, an acquisition unit 320 and a sending unit 330.

The determination unit 310 is configured to determine uplink data to be transmitted.

The acquisition unit 320 is configured to acquire a numerology used to send the uplink data, according to a service attribute of the uplink data.

The sending unit 330 is configured to send the uplink data to a network device according to the numerology.

In such a manner, according to the device for transmitting data in the embodiment of the disclosure, in a scenario that multiple numerologies are configured for the terminal, the numerology used to transmit the uplink data may be flexibly selected, thereby improving system transmission flexibility.

Optionally, in the embodiment of the disclosure, the acquisition unit 320 is specifically configured to determine the numerology according to the service attribute and preconfigured correspondences between service attributes and numerologies.

Optionally, in the embodiment of the disclosure, the acquisition unit 320 is specifically configured to: send to the network device identification information used to identify the service attribute; and receive the numerology sent by the network device, here, the numerology is determined according to the identification information.

Optionally, in the embodiment of the disclosure, the service attribute includes at least one of: a logical channel used to send the uplink data, a bearer used to send the uplink data, a data stream used to send the uplink data, a data volume of the uplink data, or a quality of service level of the uplink data.

Optionally, in the embodiment of the disclosure, the sending unit 330 is further configured to: send auxiliary information of the numerology to the network device, here, the auxiliary information is information used for the network device to acquire the numerology.

Optionally, in the embodiment of the disclosure, the determination unit 310 is further configured to: responsive to it is determined that the auxiliary information of the numerology is the same as auxiliary information of a stored numerology, not send the auxiliary information of the numerology to the network device, here, the auxiliary information of the numerology is information used for the network device to acquire the numerology.

Optionally, in the embodiment of the disclosure, the auxiliary information of the stored numerology includes auxiliary information of a numerology for previous uplink data, auxiliary information of a preconfigured numerology or auxiliary information of a default numerology.

Optionally, in the embodiment of the disclosure, the auxiliary information includes at least one of: an identifier of a numerology used to send the uplink data or next uplink data to be transmitted, an identifier of the logical channel, an identifier of the bearer, an identifier of the data volume, or an identifier of the quality of service level.

Optionally, in the embodiment of the disclosure, the sending unit 330 is specifically configured to: send the auxiliary information to the network device through a MAC PDU or high-layer signaling.

The terminal device further includes a receiving unit.

The receiving unit is configured to receive from the network device an uplink grant used to schedule the uplink data.

Optionally, in the embodiment of the disclosure, the sending unit 330 is specifically configured to: send the auxiliary information to the network device through an uplink physical channel; and send the uplink data to the network device through the uplink physical channel according to the numerology.

Optionally, in the embodiment of the disclosure, the sending unit 330 is specifically configured to send the auxiliary information to the network device through a header of the uplink physical channel.

Optionally, in the embodiment of the disclosure, the terminal device 300 further includes the receiving unit 340.

The receiving unit 340 is configured to receive the configured correspondences between service attributes and numerologies from the network device.

It is to be understood that the terminal device 300 for transmitting data according to the embodiment of the disclosure may correspond to the terminal device in the method embodiments of the disclosure and the abovementioned and other operations and/or functions of each unit in the terminal device 300 are adopted to implement the corresponding flows of the methods in FIG. 2 to FIG. 7 respectively and will not be elaborated herein for simplicity.

Figure 9:
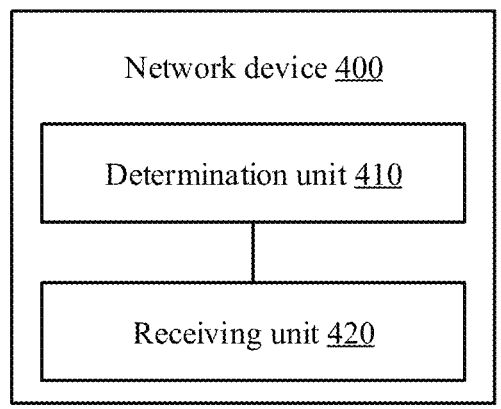
FIG. 9 is a schematic block diagram of a network device for transmitting data according to an embodiment of the disclosure.

FIG. 9 illustrates a network device 400 for transmitting data according to an embodiment of the disclosure. As illustrated in FIG. 9, the network device 400 includes a determination unit 410 and a receiving unit 420.

The determination unit 410 is configured to determine a numerology used to receive uplink data to be transmitted, according to whether auxiliary information of the numerology is received from a terminal device, here, the auxiliary information is information used by a network device to acquire the numerology.

The receiving unit 420 is configured to receive the uplink data according to the numerology.

In such a manner, according to the network device for transmitting data in the embodiment of the disclosure, in a scenario that multiple numerologies are configured for the terminal, the numerology used to transmit the uplink data may be flexibly selected, thereby improving system transmission flexibility.

Optionally, in the embodiment of the disclosure, the determination unit 410 is specifically configured to: when the auxiliary information sent by the terminal device is received, determine the numerology according to the auxiliary information; or when no the auxiliary information from the terminal device is not received, determine a stored numerology as the numerology.

Optionally, in the embodiment of the disclosure, the stored numerology includes a numerology for previous uplink data, a preconfigured numerology or a default numerology.

Optionally, in the embodiment of the disclosure, the determination unit 410 is specifically configured to, when the auxiliary information sent by the terminal device is received, determines the numerology according to the auxiliary information specifically include: the determination unit is configured to determine the numerologies according to the auxiliary information and correspondences between service attributes and numerologies.

Optionally, in the embodiment of the disclosure, the auxiliary information includes at least one of: an identifier of a numerology used to send the uplink data or next uplink data to be transmitted, an identifier of a logical channel, an identifier of a bearer, an identifier of a data volume, or an identifier of a quality of service level.

Optionally, in the embodiment of the disclosure, the receiving unit 420 is specifically configured to: when the auxiliary information is acquired through a MAC PDU or high-layer signaling, determine an uplink grant used to schedule the uplink data, according to the numerology; and receive the uplink data sent by the terminal device according to the uplink grant.

Optionally, in the embodiment of the disclosure, the receiving unit 420 is specifically configured to: when the auxiliary information is acquired through an uplink physical channel, receive and demodulate the uplink data carried in the uplink physical channel according to the numerology.

Optionally, in the embodiment of the disclosure, the network device 400 further includes a configuration unit 430 and a sending unit 440.

The configuration unit 430 is configured to configure correspondences between service attributes and numerologies.

The sending unit 440 is configured to send the configured correspondences between the service attributes and the numerologies to the terminal device.

It is to be understood that the terminal device 400 for transmitting data according to the embodiment of the disclosure may correspond to the network device in the method embodiments of the disclosure and the abovementioned and other operations and/or functions of each unit in the network device 400 are adopted to implement the corresponding flows of the methods in FIG. 2 to FIG. 7 respectively and will not be elaborated herein for simplicity.

Figure 10:
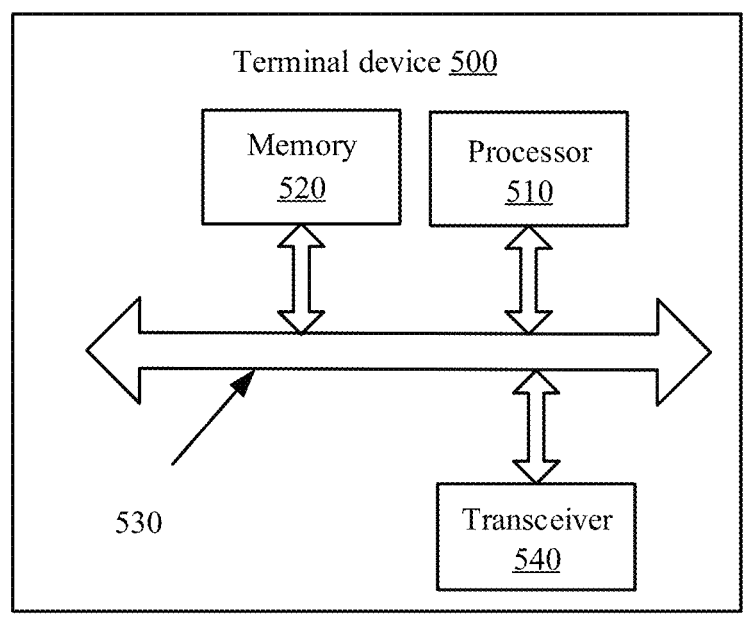
FIG. 10 is another schematic block diagram of a terminal device for transmitting data according to an embodiment of the disclosure.

As illustrated in FIG. 10, the embodiments of the disclosure also provide a terminal device 500 for transmitting data, which includes a processor 510, a memory 520, a bus system 530 and a transceiver 540. The processor 510, the memory 520 and the transceiver 540 are connected through the bus system 530. The memory 520 is configured to store an instruction. The processor 510 is configured to execute the instruction stored in the memory 520 to control the transceiver 540 to send a signal. The processor 510 is configured to: determine uplink data to be transmitted; acquire a numerology used to send the uplink data, according to a service attribute of the uplink data; and send the uplink data to a network device according to the numerology.

In such a manner, according to the terminal device for transmitting data in the embodiment of the disclosure, in a scenario that multiple numerologies are configured for the terminal, the numerology used to transmit the uplink data may be flexibly selected, thereby improving system transmission flexibility.

It is to be understood that, in the embodiment of the disclosure, the processor 510 may be a Central Processing Unit (CPU) and the processor 510 may also be another universal processor, a Digital Signal Processor (DSP), an Application Specific Integrated Circuit (ASIC), a Field-Programmable Gate Array (FPGA) or another programmable logic device, discrete gate or transistor logic device and discrete hardware component and the like. The universal processor may be a microprocessor or the processor may also be any conventional processor and the like.

The memory 520 may include a Read-Only Memory (ROM) and a Random Access Memory (RAM) and provides an instruction and data for the processor 510. A part of the memory 520 may further include a nonvolatile RAM. For example, the memory 520 may further store information of a device type.

The bus system 530 includes a data bus, and may further include a power bus, a control bus, a state signal bus and the like. However, for clear description, various buses in the figure are marked as the bus system 530.

In an implementation process, each operation of the method may be completed by an integrated logic circuit of hardware in the processor 510 or an instruction in a software form. The operations of the method disclosed in combination with the embodiments of the disclosure may be directly embodied to be executed and completed by a hardware processor or executed and completed by a combination of hardware and software modules in the processor. The software module may be located in a mature storage medium in this field such as a RAM, a flash memory, a ROM, a programmable ROM or electrically erasable programmable memory and a register. The storage medium is located in the memory 520. The processor 510 reads information in the memory 520 and completes the operations of the method in combination with hardware. No more detailed descriptions will be made herein to avoid repetitions.

It is to be understood that the terminal device 500 for transmitting data according to the embodiment of the disclosure may correspond to the terminal device and terminal device 300 in the embodiments of the disclosure and may correspond to the terminal device executing the methods according to the embodiments of the disclosure and the abovementioned and other operations and/or functions of each unit in the terminal device 500 are adopted to implement the corresponding flows of the methods in FIG. 2 to FIG. 7 respectively and will not be elaborated herein for simplicity.

Figure 11:
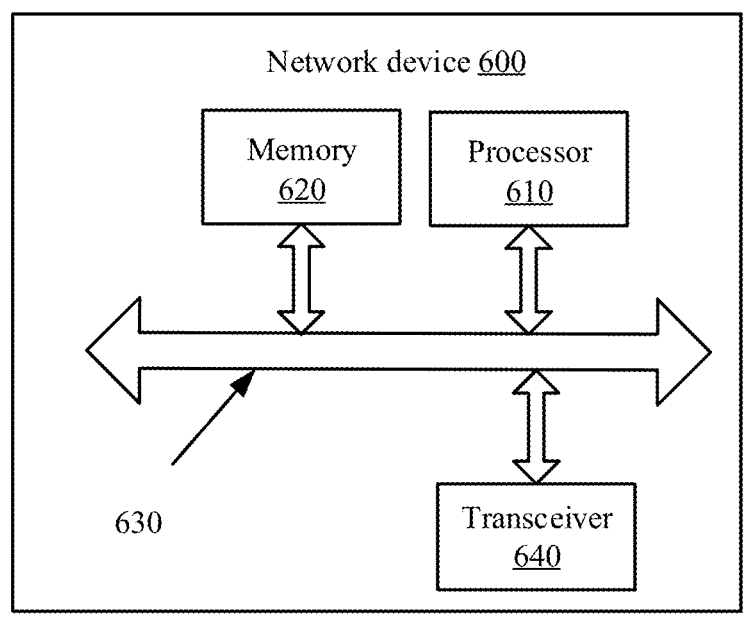
FIG. 11 is another schematic block diagram of a network device for transmitting data according to an embodiment of the disclosure.

As illustrated in FIG. 11, the embodiments of the disclosure also provide a network device 600 for transmitting data, which includes a processor 610, a memory 620, a bus system 630 and a transceiver 640. The processor 610, the memory 620 and the transceiver 640 are connected through the bus system 630. The memory 620 is configured to store an instruction. The processor 650 is configured to execute the instruction stored in the memory 620 to control the transceiver 640 to send a signal. The processor 610 is configured to: determine a numerology used to receive uplink data to be transmitted, according to whether auxiliary information of the numerology is received from a terminal device, here, the auxiliary information is information used by the network device to acquire the numerology; and receive the uplink data according to the numerology.

In such a manner, according to the network device for transmitting data in the embodiment of the disclosure, in a scenario that multiple numerologies are configured for the terminal, the numerology used to transmit the uplink data may be flexibly selected, thereby improving system transmission flexibility.

It is to be understood that, in the embodiment of the disclosure, the processor 610 may be a CPU and the processor 610 may also be another universal processor, a DSP, an ASIC, an FPGA or another programmable logic device, discrete gate or transistor logic device and discrete hardware component and the like. The universal processor may be a microprocessor or the processor may also be any conventional processor and the like.

The memory 620 may include a ROM and a RAM and provides an instruction and data for the processor 610. A part of the memory 620 may further include a nonvolatile RAM. For example, the memory 620 may further store information of a device type.

The bus system 630 includes a data bus, and may further include a power bus, a control bus, a state signal bus and the like. However, for clear description, various buses in the figure are marked as the bus system 630.

In an implementation process, each operation of the method may be completed by an integrated logic circuit of hardware in the processor 610 or an instruction in a software form. The operations of the method disclosed in combination with the embodiments of the disclosure may be directly embodied to be executed and completed by a hardware processor or executed and completed by a combination of hardware and software modules in the processor. The software module may be located in a mature storage medium in this field such as a RAM, a flash memory, a ROM, a programmable ROM or electrically erasable programmable memory and a register. The storage medium is located in the memory 620. The processor 610 reads information in the memory 620 and completes the operations of the method in combination with hardware. No more detailed descriptions will be made herein to avoid repetitions.

It is to be understood that the network device 600 for transmitting data according to the embodiment of the disclosure may correspond to the network device and network device 400 in the embodiments of the disclosure and may correspond to the network device executing the methods according to the embodiments of the disclosure and the abovementioned and other operations and/or functions of each unit in the network device 600 are adopted to implement the corresponding flows of the methods in FIG. 2 to FIG. 7 respectively and will not be elaborated herein for simplicity.

It is to be understood that the operations and/or functions of each unit in the network device provided in the embodiment of the disclosure correspond to the network device in the method side and interaction with the terminal device, the related characteristics, functions and the like correspond to the related characteristics and functions of the terminal device side and will not be elaborated herein for simplicity.

It is to be understood that, in the embodiments of the disclosure, "B corresponding to A" represents that B is associated with A and B may be determined according to A. It is also to be understood that determining B according to A does not mean that B is determined only according to A and B may also be determined according to A and/or other information.

Those of ordinary skilled in the art may realize that the units and algorithm operations of each example described in combination with the embodiments disclosed in the disclosure may be implemented by electronic hardware, computer software or a combination of the two. For clearly describing exchangeability of hardware and software, the compositions and operations of each example have been generally described in the foregoing descriptions according to functions. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiments and will not be elaborated herein for convenient and brief description.

In some embodiments provided by the application, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system. In addition, each functional unit in each embodiment of the disclosure may be integrated into a processing unit, each unit may also physically exist independently, and two or more than two units may also be integrated into a unit. The integrated unit may be implemented in a hardware form and may also be implemented in form of software functional unit.

When being implemented in form of software functional unit and sold or used as an independent product, the integrated unit may be stored in a computer-readable storage medium. Based on such an understanding, the technical solutions of the disclosure substantially or parts making contributions to the conventional art or all or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Various equivalent modifications or replacements are apparent to those skilled in the art within the technical scope disclosed by the disclosure.

The invention claimed is:

1. A method for data transmission, the method being applied to a terminal device and comprising:
   determining uplink data to be transmitted;
   receiving mapping relationships between numerologies and service attributes preconfigured by a network device through Radio Resource Control (RRC) signaling;
   determining a numerology according to a service attribute of the uplink data and the mapping relationships between numerologies and service attributes, the service attribute of the uplink data comprising a logical channel used to send the uplink data;
   sending the uplink data to the network device according to the numerology;
   sending auxiliary information of the numerology to the network device, the auxiliary information of the numerology comprising identification information used to identify the logical channel for the uplink data, to enable the network device to determine the numerology according to the identification information and the mapping relationships between numerologies and service attributes and to determine, according to the numerology, an uplink grant used to schedule the uplink data;
   receiving, from the network device, the uplink grant used to schedule the uplink data; and
   sending the uplink data to the network device according to the uplink grant,
   wherein sending the auxiliary information is responsive to determining at the terminal device that the auxiliary information of the numerology is not the same as an auxiliary information of any stored numerology stored at the terminal device.

2. The method of claim 1, wherein the service attribute further comprises at least one of: a bearer used to send the uplink data, a data stream used to send the uplink data, a data volume of the uplink data, or a quality of service level of the uplink data.

3. A terminal device for data transmission, comprising:
   a processor; and
   a memory storing instructions that, when executed by the processor, cause the processor to:

determine uplink data to be transmitted;
control a transceiver to receive mapping relationships between numerologies and service attributes preconfigured by a network device through Radio Resource Control (RRC) signaling;
determine a numerology according to a service attribute of the uplink data and the mapping relationships between numerologies and service attributes, the service attribute of the uplink data comprising a logical channel used to send the uplink data;
control the transceiver to send the uplink data to the network device according to the numerology;
control the transceiver to send auxiliary information of the numerology to the network device, the auxiliary information of the numerology comprising identification information used to identify the logical channel for the uplink data, to enable the network device to determine the numerology according to the identification information and the mapping relationships between numerologies and service attributes and to determine, according to the numerology, an uplink grant used to schedule the uplink data;
control the transceiver to receive the uplink grant used to schedule the uplink data from the network device; and
control the transceiver to send the uplink data to the network device according to the uplink grant;
wherein the operation that the processor controls the transceiver to send the auxiliary information is responsive to determining at the terminal device that the auxiliary information of the numerology is not the same as an auxiliary information of any stored numerology stored at the terminal device.

4. The terminal device of claim 3, wherein the service attribute further comprises at least one of: a bearer used to send the uplink data, a data stream used to send the uplink data, a data volume of the uplink data, or a quality of service level of the uplink data.

5. The method of claim 1, wherein the numerology further comprises at least one of the following parameters: a number of subcarriers corresponding to a system bandwidth, a number of subcarriers corresponding to a Physical Resource Block (PRB), a length of an Orthogonal Frequency Division Multiplexing (OFDM) symbol, a number of Fast Fourier Transformation (FFT) or Inverse Fast Fourier Transform (IFFT) points for generation of an OFDM signal, a number of OFDM symbols in a Transmission Time Interval (TTI), a number of TTIs in a first duration, or a length of a signal prefix.

6. The terminal device of claim 3, wherein the numerology further comprises at least one of the following parameters: a number of subcarriers corresponding to a system bandwidth, a number of subcarriers corresponding to a Physical Resource Block (PRB), a length of an Orthogonal Frequency Division Multiplexing (OFDM) symbol, a number of Fast Fourier Transformation (FFT) or Inverse Fast Fourier Transform (IFFT) points for generation of an OFDM signal, a number of OFDM symbols in a Transmission Time Interval (TTI), a number of TTIs in a first duration, or a length of a signal prefix.

7. The method of claim 1, further comprising:
responsive to determining at the terminal device that the auxiliary information of the numerology is the same as an auxiliary information of a stored numerology stored at the terminal device, not sending the auxiliary information of the numerology to the network device, the auxiliary information of the numerology being information used for the network device to acquire the numerology.

8. The method of claim 7, wherein the auxiliary information of the stored numerology comprises auxiliary information of a numerology for previous uplink data, auxiliary information of a preconfigured numerology or auxiliary information of a default numerology.

9. A method for data reception, the method being applied to a network device and comprising:
configuring mapping relationships between numerologies and service attributes; and
sending the mapping relationships between the numerologies and the service attributes to a terminal device, to enable the terminal device to determine a numerology according to a service attribute of uplink data to be sent and the mapping relationships between the numerologies and the service attributes, the service attribute of the uplink data comprising a logical channel used to send the uplink data;
receiving the uplink data from the terminal device according to the numerology;
receiving auxiliary information of the numerology from the terminal device, the auxiliary information of the numerology comprising identification information used to identify the logical channel for the uplink data;
determining the numerology according to the identification information and the mapping relationships between the numerologies and the service attributes;
determining, according to the numerology, an uplink grant used to schedule the uplink data;
sending, to the terminal device, the uplink grant used to schedule the uplink data; and
receiving the uplink data from the terminal device according to the uplink grant;
wherein receiving the auxiliary information is responsive to determining at the terminal device that the auxiliary information of the numerology is not the same as an auxiliary information of any stored numerology stored at the terminal device.

* * * * *